UNITED STATES PATENT OFFICE.

SAMUEL PEACOCK, OF CHICAGO, ILLINOIS, ASSIGNOR TO E. I. DU PONT DE NEMOURS POWDER COMPANY, A CORPORATION OF NEW JERSEY.

PROCESS OF PRODUCING TITANIUM CYANONITRIDS.

1,088,359.
No Drawing.

Specification of Letters Patent. Patented Feb. 24, 1914.

Application filed November 24, 1911. Serial No. 662,230.

*To all whom it may concern:*

Be it known that I, SAMUEL PEACOCK, a citizen of the United States, residing at Chicago, in the county of Cook and State of Illinois, have invented certain new and useful Improvements in Processes of Producing Titanium Cyanonitrids; and I do hereby declare the following to be a full, clear, and exact description of the invention, such as will enable others skilled in the art to which it appertains to make and use the same.

This invention relates to the production of titanium cyano-nitrids of which there are two forms of commercial importance, viz:

(1) $TiC_2N_4$
(2) $TiCN_2$ and has for its object to provide a process for making these products in an efficient and expeditious manner.

To these ends the invention consists in the novel steps constituting my invention, which is more fully hereinafter disclosed, and particularly pointed out in the claims.

Any suitable form of furnace, not shown, may be employed in carrying out my process, one instance being that illustrated in my copending application No. 650,973, filed September 23, 1911, for process of producing compounds of aluminum, carbon and nitrogen.

More particularly stated, this process consists in taking advantage of the relation which exists between the equilibrium temperatures and pressures of the formation of titanium carbids and nitrogen containing titanium compounds, the exact nature of which I have not as yet determined, but which I believe to be and will call herein titanium cyano-nitrids to form them at a temperature in the neighborhood of 1800° C., and at a total pressure of about two atmospheres or higher, while the partial pressure of carbon monoxid CO in the furnace is below that of the atmosphere, or say at 100 to 200 millimeters of mercury, or lower.

In carrying out my process, I take finely divided and dry titanium oxid $TiO_2$, and finely divided and dry carbon, preferably as coke or charcoal, and mix the same together thoroughly, in chemically equivalent proportions conforming to the following equations:—

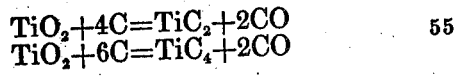

$$TiO_2 + 4C = TiC_2 + 2CO$$
$$TiO_2 + 6C = TiC_4 + 2CO$$

I may, however, and preferably use carbon in excess of that necessary for the above reaction, to the extent of 20 to 30 per cent., more or less, in order to prevent the formation of titanium nitrids, which contain a lower percentage of nitrogen than do my titanium cyano-nitrids. Further, said excess of carbon insures the more ready complete conversion of the titanium to the cyano-nitrid form, while it is not injurious to the process.

I am aware that the carbid of titanium commonly known, consists of one equivalent each of titanium and carbon (TiC), and such is the form of carbid usually obtained when treating a mixture of titanium oxid and carbon at temperatures of 1800° C. and higher under atmospheric pressure, and also in the presence of carbon monoxid CO the product of the reaction at a partial pressure of about one-half an atmosphere or higher. But under such conditions of a comparatively high partial pressure, unless the mass is molten and the total pressure on the mixture vastly increased, the higher carbids cannot exist because they will be dissociated as fast as formed to the lower carbids. For example, calcium carbid $CaC_2$ when heated at about 1000° C. to 1200° C. in a vacuum or in an atmosphere of inert gas, breaks down from $CaC_2$ to CaC. In other words, as is well known, under suitable conditions, although higher metallic carbids of the acetylene forming group such as $CaC_2$ or $TiC_4$, and of the ethylene forming group such as CaC, or $TiC_2$, may be formed, yet they will be immediately dissociated into a methane forming group such as $Ca_2C$ or TiC, unless the pressure is maintained at a high point, and the temperature correspondingly raised. Of course, however, should the temperature be lowered in such case, the reaction would cease and therefore no carbid would be formed. The suitable conditions, therefore, for the formation of these higher carbids at a temperature as low as 1800° C.

and at a total pressure of say about two atmospheres or more, is a low partial pressure of the reaction product carbon monoxid CO to about 200 m. m. or less. But, of course, these higher carbids may be formed at a temperature higher than 1800° if a higher total pressure is employed, and also a partial pressure of carbon monoxid not exceeding 20 per cent. or less of the said total pressure. An example illustrating these conditions is given as follows:—Calcium carbid $CaC_2$ is readily formed, when a mixture of calcium oxid CaO and carbon is heated to such temperatures that the lime becomes quite fluid and a molten mass is formed. Such temperatures will be as high as from say 2500° C. to 3000° C. Under these hydrostatic conditions, the pressure in the mass rises above that of the atmosphere 760 m. m., while the molten charge is comparatively low in carbon monoxid CO, and therefore while the partial pressure of the latter is less than 760 m. m. By my process, therefore, it will be seen that I may produce these higher carbids at a temperature of about 1800° C. by maintaining the partial pressure of the carbon monoxid as low as from 100 to 200 m. m. and by employing a total pressure in the furnace of about two atmospheres or higher. Since, however, the main object of my process is the production of titanium cyano-nitrid, I preferably maintain these two atmospheres of pressure by the controlled admission of nitrogen into the furnace, while carbon monoxid is being liberated as a result of the following reaction:—

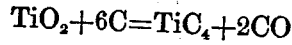

$$TiO_2 + 6C = TiC_4 + 2CO$$

The velocity of this reaction decreases rapidly unless the temperature is raised, but increasing the temperature tends to dissociate the higher carbid to the lower form TiC, which is undesirable. Therefore, I maintain a steady flow at a constant pressure of nitrogen over the heated mixture; the carbon monoxid being thus removed by the escape of nitrogen as rapidly as it is formed. In this manner, I maintain a very low carbon monoxid partial pressure to facilitate the formation of the higher carbids while the nitrogen reacts with the latter to form the cyano-nitrids, in accordance with the following equations:—

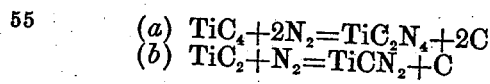

(a) $TiC_4 + 2N_2 = TiC_2N_4 + 2C$
(b) $TiC_2 + N_2 = TiCN_2 + C$

Both reactions occur simultaneously, but the reaction (a) proceeds under lower temperatures and much lower carbon monoxid partial pressures than does reaction (b). As the mechanical limitations of the furnace do not enable me to maintain a constant absence of carbon monoxid from the atmosphere of the furnace, the final end product consists of a variable proportion of the two titanium cyano-nitrids useful for the production of ammonia and other compounds.

The industrial advantage of producing titanium cyano-nitrid over producing titanium nitrid $Ti_3N_4$ is that the former effects the fixation of more nitrogen per unit of metallic oxid than the latter, and also at a lower consumption of energy; also, the titanium cyano nitrid is capable of conversion into organic nitrogen compounds of high industrial value, whereas the nitrid $Ti_3N_4$ may be effectively converted into ammonia only.

It is obvious that those skilled in the art may vary the details of my process without departing from the spirit thereof, and therefore I do not wish to be limited to the above disclosure except as may be required by the claims.

What I claim is:—

1. The process of producing nitrogen containing titanium compounds which consists in heating, in the presence of nitrogen, titanium oxid mixed with carbon to a temperature sufficient to produce said compounds while maintaining the partial pressure of the evolved carbon monoxid not substantially higher than 200 millimeters of mercury, substantially as described.

2. The process of producing nitrogen containing titanium compounds which consists in heating, in the presence of nitrogen, titanium oxid mixed with carbon under a total pressure not substantially less than two atmospheres and to a temperature sufficient to produce said compounds while maintaining the partial pressure of the evolved carbon monoxid not substantially higher than 200 millimeters of mercury, substantially as described.

3. The process of producing nitrogen containing titanium compounds which consists in heating, in the presence of nitrogen, under a pressure not substantially less than two atmospheres, a mixture of titanium oxid and carbon at a temperature of substantially 1800° C. to produce said compounds while maintaining the partial pressure of the evolved carbon monoxid not substantially higher than 200 millimeters of mercury, substantially as described.

4. The process of producing nitrogen containing titanium compounds which consists in heating, in the presence of nitrogen, under a pressure not substantially less than two atmospheres, a mixture of titanium oxid and carbon the latter being in excess of that required for a chemically equivalent proportion and at a temperature of substantially 1800° C. to produce said compounds while maintaining the partial pressure of the evolved carbon monoxid not substantially higher than 200 millimeters of mercury, substantially as described.

5. The process of producing the higher carbids of titanium which consists in heating a mixture of titanium oxid and carbon to a temperature sufficient to produce said carbids while maintaining the partial pressure of the evolved carbon monoxid not substantially higher than 200 millimeters of mercury, substantially as described.

In testimony whereof, I affix my signature, in presence of two witnesses.

SAMUEL PEACOCK.

Witnesses:
T. A. WITHERSPOON,
GEO. B. PITTS.